Patented Oct. 8, 1929

1,730,692

UNITED STATES PATENT OFFICE

HUGO SCHWEITZER AND JOHANN HUISMANN, OF WIESDORF-ON-THE-RHINE, GERMANY, ASSIGNORS TO GENERAL ANILINE WORKS, INC., OF NEW YORK, N. Y., A CORPORATION OF DELAWARE

TRISAZO DYESTUFFS

No Drawing. Application filed April 26, 1927, Serial No. 186,814, and in Germany May 17, 1926.

The present invention relates to azo dyestuffs of the general formula:

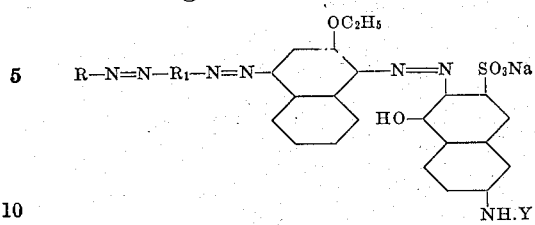

wherein R and $R_1$ represent aryl nuclei and Y represents hydrogen or an aryl nucleus. These dyestuffs may be obtained by coupling the diazo compound of a secondary disazo dyestuff containing in the end position the radicle of a 1-amino-2-naphthol ether with a 2-amino-5-naphthol-7-sulfonic acid compound.

The new dyestuffs are generally dark powders soluble in water with a bluish-green and in concentrated sulfuric acid with a blue coloration, dyeing cotton in clear greenish blue shades of good fastness properties and yielding by reduction with stannous chloride and hydrochloric acid, sulfonic acids of aromatic amines, aromatic diamines and their sulfonic acids; 2-ethoxy,-14-naphthylene-diamine and 2,6-diamino-5-naphthol-7-sulfonic acid and its derivatives.

The azo dyestuffs described and claimed in this application are similar in constitution to those described and claimed in U. S. Patent No. 1,601,991.

The invention will be more fully described by reference to the following specific example:—

25.3 grams of aniline-3.6-disulfonic acid are diazotized with sodium nitrite and hydrochloric acid in the customary manner. The diazo compound is caused to run into a solution of 24.5 grams of the sodium salt of 1-naphthylamine-7-sulfonic acid in about 500 c. c. of water. When the coupling is complete, 60 c. c. of commercial hydrochloric acid are run into the mixture and diazotation is effected with 69 c. c. of a 10% sodium nitrite solution. The diazo compound passes into solution; it is salted out with common salt, filtered, washed with saturated salt solution and introduced into a hydrochloric acid solution of 18.7 grams of 1-amino-2-naphthol ethyl ether in about one litre of water. After stirring for some 10 hours the dyestuff is salted out, filtered and washed with saturated salt solution. The washed dyestuff is suspended in 300 c. c. of water; ice is caused to float in the suspension, and 8 c. c. of caustic soda solution (30° Bé.) are added with brisk stirring. 70 c. c. of a 10% sodium nitrite solution are now introduced and the dyestuff is diazotized by causing 60 c. c. of commercial hydrochloric acid to run in. The resulting diazo solution is then added to an ice cold solution of 31.5 grams of 2-phenylamino-5-naphthol-7-sulfonic acid in 50 c. c. of water and 100 c. c. of pyridine. When the coupling is complete the dyestuff is worked up in the known manner. The dyestuff has most probably the formula:—

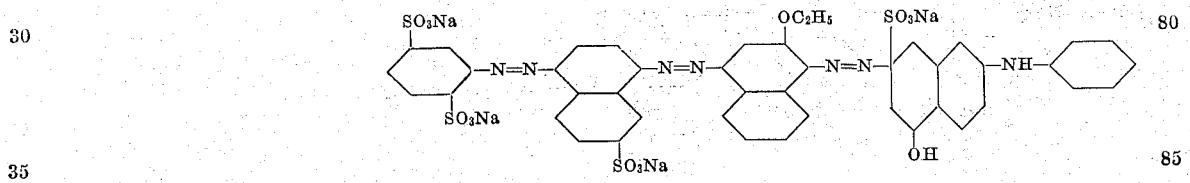

This dyestuff represents in dry state a bluish-black powder soluble in water with a greenish-blue and in concentrated sulfuric acid with a pure blue coloration. It dyes cotton in a clear greenish blue shade of good fastness properties especially fastness to light. The dyestuff yields by reduction with stannous chloride and hydrochloric acid aniline-3.6-disulfonic acid

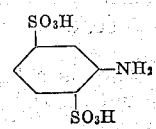

1,4 naphthylene-diamine-7-sulfonic acid

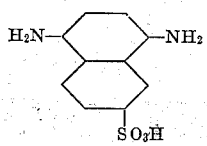

2-ethoxy-1.4-naphthylenediamine

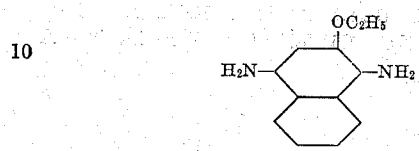

and 2-phenylamino-6-5-amino naphthol-7-sulfonic acid

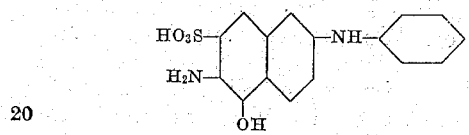

In an analogous manner further dyestuffs can be produced by replacing the 2-phenylamine-5-naphthol-7-sulfonic acid by 2-amino-5-naphthol-7-sulfonic acid or its derivatives and substitution products.

We claim:—

1. As new products the trisazo dyestuffs of the general formula:

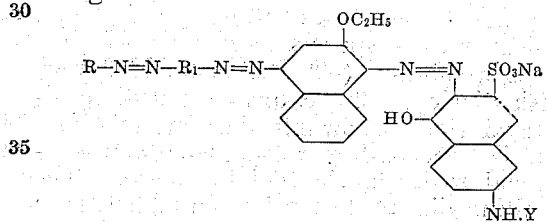

wherein R and $R_1$ represent aryl nuclei and Y represents hydrogen or an aryl nucleus.

2. As new products the trisazo dyestuffs of the general formula:

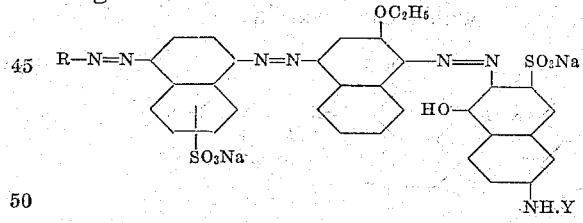

wherein R represents an aryl nucleus and Y represents hydrogen or an aryl nucleus.

3. As a new product the azo dyestuff of the probable formula:

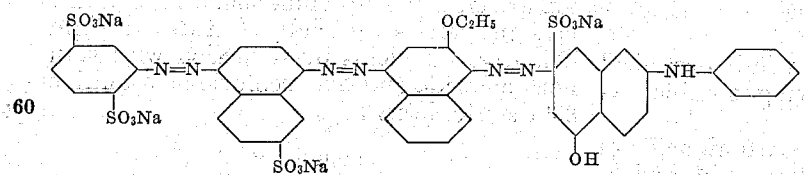

which in a dry state is a blue-black powder soluble in water with a greenish-blue and in concentrated sulfuric acid with a pure blue coloration and which dyes cotton clear bluish-green shades of good fastness to light.

In testimony whereof we have hereunto set our hands.

HUGO SCHWEITZER.
JOHANN HUISMANN.

Certificate of Correction

Patent No. 1,730,692.  Granted October 8, 1929, to

HUGO SCHWEITZER ET AL.

It is hereby certified that error appears in the printed specification of the above numbered patent requiring correction as follows: Page 1, line 28, for "14" read *1, 4;* same page strike out the second formula and the corresponding formula of claim 3 on page 2 and insert instead—

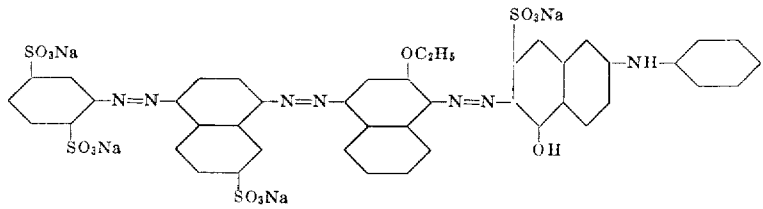

and that the said Letters Patent should be read with these corrections therein that the same may conform to the record of the case in the Patent Office.

Signed and sealed this 18th day of February, A. D. 1930.

[SEAL.]

M. J. MOORE,
*Acting Commissioner of Patents.*